United States Patent

[11] 3,598,954

[72] Inventors William F. Iceland
 Los Alamitos;
 Donald R. Lien, La Habra, both of, Calif.
[21] Appl. No. 823,635
[22] Filed May 12, 1969
[45] Patented Aug. 10, 1971
[73] Assignees North American Rockwell Corporation;
 Air Products and Chemicals, Inc.
 Allentown, Pa., part interest to each

[54] CONTROL FOR REVERSE-POLARITY WELDING
 6 Claims, 2 Drawing Figs.
[52] U.S. Cl. .................................................. 219/131 R,
 219/130, 219/131 WR
[51] Int. Cl. ................................................. B23k 9/10
[50] Field of Search .......................................... 219/130,
 131, 131 R, 131 F, 135, 137

[56] References Cited
 UNITED STATES PATENTS
 3,330,933 7/1967 Maklary .................... 219/131

Primary Examiner—J. V. Truhe
Assistant Examiner—C. L. Albritton
Attorneys—William R. Lane, Allan Rothenberg and Magnes ABSTRACT: A reversing polarity arc-welding technique, wherein a welding current waveform has alternate "straight-polarity" portions and "reverse-polarity" portions; the reverse-polarity portion being desirable for its ionic cleaning, but being undesirable for its electron bombardment of the welding electrode. This disclosure teaches the advantages of reducing the welding current during the reverse-polarity interval; and discloses electronic circuitry for achieving this result.

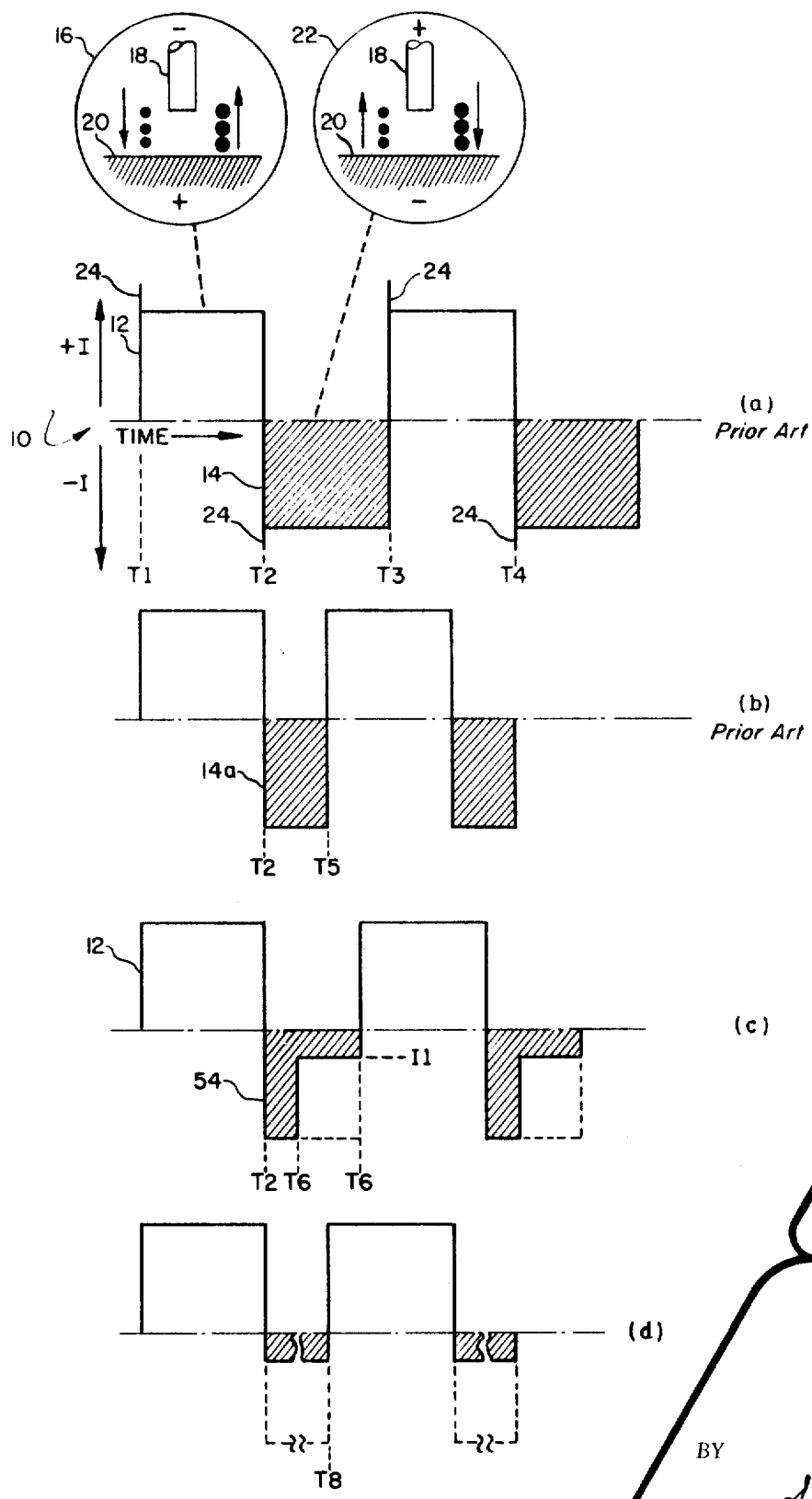

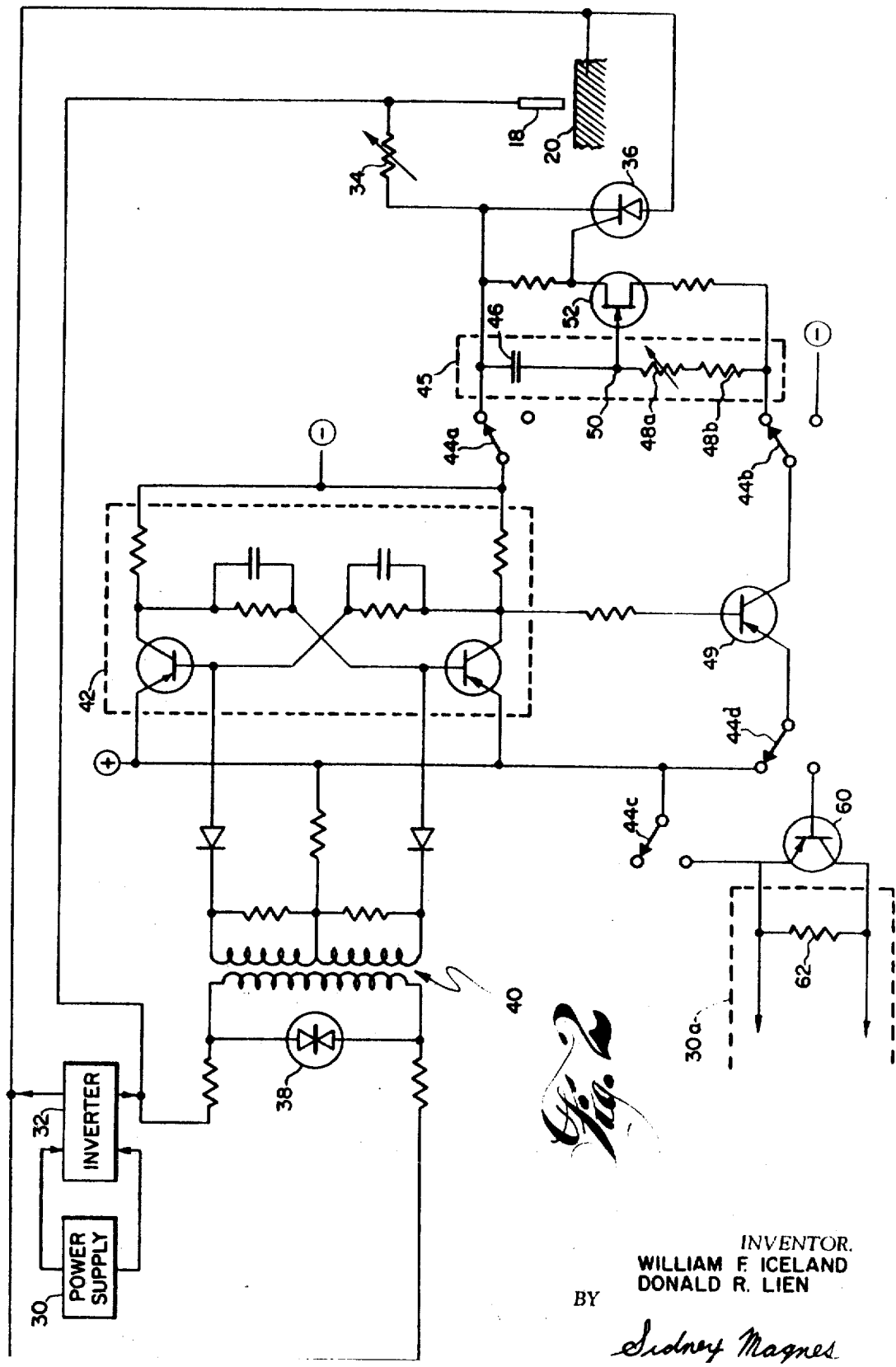

CONTROL FOR REVERSE-POLARITY WELDING

BACKGROUND

Arc welders have found that the Tungsten/Inert Gas (TIG) welding technique is capable of producing a higher quality result than many other presently used techniques; so that as this technique becomes more widely used, it becomes desirable to improve it even more. In this TIG welding technique one electrode is the workpiece, and the other electrode is a tungsten rod; the welding current flowing between these two electrodes and thus establishing a welding arc in the welding area. Ordinarily (i.e., in "straight-polarity" welding) the tungsten electrode is at a negative electrical potential, and the workpiece is at a positive electrical potential; so that the electric field between the electrodes (a) causes the tungsten rod to emit electrons, and (b) accelerates the lightweight electrons to a high velocity, in the direction of the positively charged workpiece. Here, the high-velocity electron impingement heats the workpiece to its melting point; resulting in a "weld puddle" that permits the mating of the various sections of the workpiece. It is primarily these high-velocity electrons that form the welding arc.

An inert gas forms an atmosphere at the welding area, and tends to minimize externally caused contamination; and since the tungsten electrode does not actually enter into the welding process, it also tends to minimize contamination. Thus, TIG welding tends to produce a high quality weld.

As discussed above, electrons are emitted from the tungsten electrode, and are accelerated toward the workpiece. During their movement, some electrons collide with some of the molecules of the inert gas that surrounds the welding area; the collisions resulting in a tearing apart ("ionizing") of the gas molecules. This liberates additional electrons, and produces a number of electrically charged "ions."

Since most of these "ions" have a positive charge, they are accelerated by the electric field in a direction opposite that of the electrons; in this case, toward the tungsten electrode. Because of the relatively high mass of the ions, they never reach the high velocity of the lighter weight electrons; but the impingement of the ions onto the tungsten electrode does heat the tip of the tungsten electrode. However, since tungsten has a very high melting point, the tungsten electrode does not melt; rather, it achieves an incandescent state that aids the liberation of additional electrons—these helping to sustain the welding arc.

It should be noted that the nearly point source of electrons (tip of the tungsten electrode) tends to produce a desirably deep narrow weld puddle.

Optimum welding results are obtained when the workpiece is carefully cleaned, and preweld cleaning is performed both mechanically and chemically; but preweld cleaning is not completely satisfactory—especially on long welds and on materials, such as aluminum, that oxidize rapidly. Improved cleaning may be achieved as follows.

If the welding polarity (electric field discussed above) is reversed, it produces a negatively charged workpiece and a positively charged electrode; and the positively charged ions now move in the opposite direction of that discussed above, i.e., they now impinge onto the negatively charged workpiece. Here, the ion impingement removes oxides, grease, and other contaminants—thus cleaning and etching the workpiece. Since this now clean welding area of the workpiece is in an inert atmosphere, it remains clean; and produces an improved welding operation.

However, the reversed polarity introduces several problems. First of all, the workpiece is not a good source of electrons; and—due to the lack of electrons—the welding arc tends to extinguish. Another problem associated with the reverse polarity state is that the lightweight electrons are now accelerated toward the tungsten electrode; and the resultant high-velocity electron impingement now raises the temperature of the tungsten electrode to its melting point—this being unsatisfactory for a welding operation.

Still another problem associated with the reverse-polarity state is caused by the fact that the ions originate in a large volume of gas (rather than at a pinpoint location). This broad ion source causes the ions to impinge upon the workpiece in a large area; thus cleaning a large area, but meanwhile producing a large shallow weld puddle—as compared with the desired deep narrow weld puddle produced by electron impingement. Thus, the cleaning effect of the reverse-polarity operation is offset by its disadvantages.

A first prior art approach for providing arc-sustaining electrons during the reversed-polarity state, was to superpose a high frequency voltage between the welding electrode and the workpiece. This high frequency voltage cyclically withdraws electrons from the tungsten electrode; thus producing a continuous copious supply of electrons. However, many materials welded by the use of this method show an undesirable surface condition; and some welding experts blame this surface condition on the presence of the high frequency energy, and call this surface condition "high frequency pitting."

A second approach for providing electrons is to use a high voltage during the reverse-polarity state. In all probability, this high voltage draws electrons from the workpiece by so-called "cold emission." Unfortunately, the high voltage accelerates the electrons to an extremely high velocity, and the resultant high-velocity electron bombardment raises the tungsten electrode to a dangerously high temperature that may exceed its melting point.

OBJECTS AND DRAWINGS

It is therefore an object of the present invention to provide an improved welding control wherein the reversed-polarity state is modified to provide the desired cleaning and etching of the workpiece without extinguishing the arc.

The attainment of this object and others will be realized from the teachings of the following specification taken in conjunction with the drawings of which:

FIG. 1 shows a plurality of waveforms relating to welding; and

FIG. 2 shows a schematic diagram of a circuit for practicing the disclosed invention.

INTRODUCTION

Welding power supplies are carefully designed to produce specific characteristics and may contain complex feedback circuits that should not be altered or modified. Many welding power supplies are commercially available; one such being the model 300HFSG made by the Harnischfeger Corporation of West Milwaukee, Wisconsin. This particular welding power supply produces a DC welding current; and a built-in "inverter" controlled by a manual switch provides either a straight or a reversed polarity.

In those cases where a cyclically reversing polarity is desired, an electronic switch may be used; one apparatus suitable for cyclically inverting the polarity being the Sciaki switch SW3 made by the Sciaki Welding Company of Chicago, Illinois.

Alternatively, self-contained equipment—including a power supply and a polarity reverser—is capable of inherently producing alternate pulses of the straight and reversed polarity.

FIG. 1a shows a typical idealized waveform 10 that indicates a reversing welding current waveform, such as discussed above. In FIG. 1a the upper or "positive-going" portion 12 of waveform 10 is produced by the straight polarity; and the cross-hatched downward or "negative-going" portion 14 of waveform 10 is produced by the reversed polarity. For clarification, FIG. 1 includes a symbolic representation 16 of a straight-polarity welding operation; showing an electrode 18, a workpiece 20, their electrical polarities, the direction of movement of the small electrons, and the direction of movement of the larger ions. FIG. 1 similarly, includes a symbolic representation 22 of the same elements for the reversed-polarity condition.

Referring back to FIG. 1a, it will be noted that waveform 10 starts, at the extreme left at a time such as T1; the horizontal portion of loop 12 indicating the current that exists for the duration of the welding operation. At a time such as T2, the polarity is reversed; and the trailing edge of loop 12 drops precipitously, showing that the welding current decreases in value to zero. At or near its zero value, the reduced magnitude current and its polarity is such that the welding arc tend to extinguish.

The negative-going loop 14 increases precipitously downward to a predetermined current value. It is during this reverse-polarity state that the workpiece is being cleaned by ionic bombardment (see representation 22), a desirable feature.

At the end of loop 14, say at time T3, the current is again reversed; and waveform 10 again becomes positive going to form another positive loop indicative of straight-polarity welding. At the end of this second positive-going loop, the welding current again reverses itself; and another straight-polarity welding loop is formed to resume the straight-polarity welding.

It may therefore be seen that the actual welding occurs during the positive-going loops; and that the ionic bombardment and cleaning of the workpiece occurs during the negative-going loops. It is during these negative-going loops that the tungsten electrode is endangered by the high-velocity electron bombardment.

As discussed above, the welding arc tends to extinguish itself each time that the current value crosses its base, or zero, value. In order to reignite the arc, a higher-than-normal voltage is generated at this time; and is applied between the electrode and workpiece—the abnormally high voltage producing a momentary large pulse of current that shows up as a transient "spike" 24. This reignition spike 24 is generated for each reversal, as shown in FIG. 1a; but, for clarity, the spikes are omitted from subsequent illustrations.

The cross-hatched area of the negative-going loops is an indication of the energy involved for that time interval; and since a large part of this energy is electron bombardment that is destroying the tungsten electrode, it is desirable to limit the amount of energy in the negative-going loops—without, however, interferring with the ionic cleaning.

One prior art technique for achieving this reduced-energy result is shown in FIG. 1b; this being achieved by an early termination (say at time T5) of the time interval of the negative-going loop 14a; in this way limiting the length of time during which the tungsten electrode is exposed to the deleterious bombardment of electrons. However, this shortened time interval (T2—T5) also inherently limits the time interval for the ionic cleaning; so a compromise had to be made between cleaning the workpiece, and protecting the tungsten electrode.

SYNOPSIS

Briefly stated, the present invention achieves optimal ionic cleaning along with minimal electrode bombardment as follows. Since the welding power supply ordinarily should not be modified, applicants arrange to place a load resistor in parallel with the welding arc during periods of reverse polarity; the power supply still continuing to operate in its design manner. However, a predetermined portion of the current is shunted away from the welding arc, and directed through the newly introduced load resistor, so that the welding arc itself contains fewer electrons and fewer ions. The reduced number of electrons thus protects the tungsten electrode by minimizing its electron bombardment. While the decreased number of ions minimizes the effectiveness of the ionic cleaning, the time duration during which the reduced reversed current is present in the welding arc can be lengthened. Thus, the ionic cleaning persists for a longer duration of time at a lower intensity—in this way producing the desired cleaning and minimizing the damage to the tungsten electrode.

DISCLOSURE

Referring now to FIG. 2, this shows a schematic diagram of circuitry for achieving the desired result. In this illustration, a power supply 30 coacts with an inverter 32 to provide the reversing waveform previously discussed. (See FIGS. 1a and 1b) The output of inverter 32 is applied to a welding arrangement comprising electrode 18 and workpiece 20 that form an electrode/workpiece gap; and produces the welding operation described above.

In FIG. 2, a load resistor 34 is connected by means of a switching arrangement 36 in parallel, or shunt, with the welding area; so that when switching arrangement 36 is electrically "open," the welding operation performs in its usual manner—but when switching arrangement 36 is electrically "closed," load resistor 34 is connected in parallel with the welding arc.

The illustration shows switching arrangement 36 to comprise a silicon-controlled rectifier (SCR) whose operation will be discussed later.

In order to control the above described switching arrangement 36, the output of inverter 32 is applied to a regulator 38 for maintaining a constant voltage, which is impressed across the primary winding of a transformer 40. The output of transformer 40 is rectified, and applied to a flip-flop circuit 42. In this way, each time that the waveform reverses, an initiation signal causes flip-flop circuit 42 to be switched to its alternate state.

A first mode switch 44a (shown in its upper position) when closed, applies a negative potential from a potential source to the "top" of a timing network 45; this network comprising a plurality of timing elements, i.e., a timing capacitor 46 and a pair of timing resistors 48a and 48b. A second mode switch 44b (also shown in its upper position) permits the control signal from flip-flop circuit 42 to be applied to the base electrode of transistor 49, thus enabling it; a positive potential applied—through the enabled transistor 49 and through the second mode switch 44b—to the "bottom" of the timing network 45. The two mode switches 44a are preferably ganged together.

OPERATION

When inverter 32 initiates the straight-polarity positive-loop portion of the waveform, it simultaneously applies a voltage to transformer 40, so that the initiation signal thereupon sets flip-flop 42 to a first predetermined state wherein its output control signal is of such a polarity as to disable transistor 49. Thus switching arrangement 36 is open (as will be discussed later); the load resistor 34 is disconnected; and the power supply/inverter provides current to the welding arc between electrode 18 and workpiece 20. The welding operation proceeds in its normal manner.

When inverter 32 produces the reverse-polarity negative-loop portion of the waveform, the power supply provides its design current to the welding area between electrode 18 and workpiece 20; but the welding current now flows in the opposite direction, as discussed in connection with the waveforms of FIGS. 1a and 1b.

However, in accordance with the present disclosure, the following events take place. First of all, when the inverter 32 reverses the polarity of the current flow to produce the beginning of the negative loop, it simultaneously applies an opposite-polarity voltage to transformer 40 so that the resultant initiation signal thereupon sets flip-flop 42 to its alternate state. In this state, the control signal from flip-flop 42 produces a signal that enables transistor 49, and applies the control signal to the "bottom" of timing network 45. As timing capacitor 46 charges up, it raises the voltage at pickoff point 50; and eventually this voltage reaches a value at which it becomes an activating signal that causes unijunction transistor 52 to become conductive. At this time, the unijunction transistor 52 produces a delayed trigger signal that causes the silicon-controlled rectifier 36 to become conductive—thus placing load resistor 34 in parallel with the welding arc. As load resistor 34 is connected in parallel with the welding arc, some of the welding current flows through it, and the arc current is reduced.

It should be noted that the control signal from flip-flop circuit 42 is additionally applied to the anode of unijunction transistor 52; thus enhancing the effectiveness of the control signal from the flip-flop circuit.

When the inverter again produces the straight-polarity operation, the initiation signal resets the flip-flop to its first state wherein its control signal has no effect. At this time the timing capacitor 46 discharges through timing resistances 48a and 48b; and thus removes the activating signal from unijunction transistor 52. Moreover, the reversal of the welding current causes SCR 36 to become nonconductive; and in this way the load resistor 34 is disconnected from the circuit.

A clearer understanding of this reverse-polarity portion of the operation will be obtained from a study of FIG. 1c. Here, the positive-going loop 12 is completed in the normal way; and the inverter then proceeds to provide the negative-going loop 54. After a given delay interval (controlled by the timing network as discussed above) load resistor 34 is connected in shunt with the welding arc; this occurring, say, at time T6. Depending upon the value of the load resistor, the amount of current flowing through the welding arc is immediately decreased to a value of I1 as indicated in FIG. 1c. The cross-hatched area indicates the reduced energy in the welding area, and the dotted rectangles indicate the current flowing through the load resistor.

It has been found that the delay interval T2—T6 of FIG. 1c can be shortened to any desired extent; but it should be realized that if the time interval T2—T6 is shortened to the point where it is nonexistent, the load resistor will always be connected across the welding gap—and the welding arc can therefore never be initiated. Thus, the timing circuit permits time interval T2—T6 to be set for optimum conditions; shown idealized in FIG. 1d—the termination T8 of FIG. 1d being selected for optimal results. Here too, the dotted rectangles indicate the current that is flowing through the load resistor, rather than through the welding arc.

In this way, the load resistor is temporarily connected into the welding circuit for at least a portion of the reverse-polarity loop. While the above explanation has been presented in terms of a DC welding operation, it is apparent that the disclosed teachings can be applied with other types of arc welding, with welding currents having other waveforms, with AC power supplies.

It has been pointed out that reducing the arc current during the reverse-polarity portion of the welding cycle protects the tungsten electrode against damage by electron bombardment; the reduced current providing better protection than the prior art approach of reducing the time interval. An explanation of this phenomenon may be that the less intense electron bombardment over a relatively long time interval permits better heat dissipation than more intense electron bombardment for a short time interval. This theory would explain why the cross-hatched areas of FIGS. 1c and 1d would provide more satisfactory welding results than the cross-hatched areas of FIG. 1b— even through the cross-hatched areas might be equal.

The above disclosure has been directed primarily to the use of a design current characteristic welding power supply; but there are other types of welding power supplies that have provisions for accepting external signals that control the magnitude of the welding current, generally using an external pushbutton or control to short out or vary a voltage or a resistance.

FIG. 2 shows circuitry for achieving this result. Directing attention to mode switches 44a and 44b, if these are set to their lower positions, the following effects are produced. The first mode switch 44a disconnects the timing network 45 (and subsequent circuitry) from flip-flop 42. The second mode switch 44b also disconnects the timing network (and subsequent circuitry) from the flip-flop 42; and now, instead, connects a negative power source to the collector electrode of transistor 49.

Mode switches 44c and 44d are similarly set to their lower positions; switch 44c providing operating potential for a switching transistor 60, and switch 44d applying the flip-flop's control signal to the base electrode of transistor 60.

The operation is now as follows. Flip-flop 42 is cyclically reset by the initiation signal as explained above; but now its output periodically enables transistor 60. When this transistor becomes conductive, it shorts out a control resistor 62 in the power supply 30a; this now reducing the magnitude of the output welding current produced by the power supply. In this way, transistor 60 switches control resistor into and out of the power supply circuitry; thus reducing the welding current during the reverse-polarity interval.

While the above explanation has been presented in terms of TIG welding, it is obvious that these teachings can also be applied to other forms of arc welding; i.e., plasma, stick electrode, and the like.

SUMMARY

In this way, the number of electrons in the welding arc is reduced during the reversed-polarity portion of the welding operation; thus protecting the electrode. If the ionic cleaning of the workpiece happens to be decreased too greatly, the duration of the reverse-polarity portion can be lengthened without adversely affecting the electrode or the welding operation. The electrode performs much better under the long-duration/fewer electron condition of the disclosed apparatus, than it did under the short-duration/more numerous electron condition of prior art conditions.

What we claim is:

1. In combination:
   an alternating current power supply supplying welding current having a waveform with alternating straight polarity loops and reverse-polarity loops, and
   means for reducing the welding current during at least a portion of each of the reverse-polarity loops,
   said means comprising a load resistor;
   means for connecting said load resistor in parallel with a welding arc during said portion of each of said reverse-polarity loops;
   said connecting means comprising means comprising switching means connected in series with said load resistor, and
   means including a unijunction transistor for closing said switching means only during said reverse-polarity loop, for diverting a portion of the welding current from said welding arc to said load resistor.

2. The combination of claim 1, including
   means for opening said switching means during said straight-polarity loops, for reestablishing the full welding arc during said straight-polarity loop.

3. The combination of claim 4 including a timing circuit having:
   a timing-capacitor timing element;
   at least one variable timing-resistor timing element;
   means for serially connecting said timing capacitor and said timing resistor, said connection having a takeoff point;
   means for directing electric current to flow through said serially connected timing elements, for causing the potential at said takeoff point to change in a manner controlled by the values of said timing elements;
   a unijunction transistor;
   a connection from said takeoff point to the base electrode of said unijunction transistor—whereby said changing potential at said takeoff point may activate said transistor; and
   connecting means connected between said transistor and said switching means for causing said transistor, when activated, to produce a trigger signal for closing said switching means.

4. In combination:

an alternating current power supply supplying welding current having a waveform with alternate straight-polarity loops and reverse-polarity loops applied across a gap formed between an electrode and workpiece to produce a welding arc;

first means for producing an initiating signal at each change of polarity loops of said waveform;

second means for producing the welding current during at least a portion of each of the reverse-polarity loops, said second means comprising a load resistor; and connecting means for temporarily connecting said load resistor in parallel with said welding arc during said portion of each said reverse-polarity loops;

said connecting means comprising switching means connected in series with said load resistor, and closing means—activated by said initiating signal—for closing said switching means only during said reverse-polarity loops, for diverting a portion of the welding current from said welding arc to said load resistor;

said closing means comprising a timing circuit; means for causing said initiating signals to produce a control signal; and means for applying said control signal to said timing circuit, causing said timing circuit to produce a delayed trigger signal for closing said switching means; and means—activated by said initiating signal—for opening said switching means during each of said straight-polarity loops, for reestablishing the full welding arc during each of said straight-polarity loops.

5. The combination comprising:

first means for producing alternating current whose current waveform has alternate straight-polarity loops and reverse-polarity loops;

second means for producing an initiating signal at each change of polarity of said waveform;

third means for applying the alternating current across an electrode/workpiece gap to produce a welding arc;

fourth means for reducing the current during at least a portion of each of the reverse-polarity loops;

said fourth means comprising a load resistor; and connecting means for temporarily connecting said load resistor in parallel with said welding arc during said portion of each of said reverse-polarity loops;

said connecting means comprising switching means connected in series with said load resistor; and closing means—activated by said initiating signal—for closing said switching means only during each of said reverse-polarity loops, for diverting a portion of the current from said welding arc to said load resistor;

said closing means comprising a flip-flop circuit; means for causing said initiating signals to control the state of said flip-flop circuits; means for causing a given state of said flip-flop circuit to produce a control signal; and a timing circuit;

said timing circuit having:

a timing-capacitor timing element;

at least one variable timing-resistor timing element;

means for serially connecting said timing capacitor and said timing resistor, said connection having a takeoff point;

means for directing said control signal from said flip-flop to flow through said serially connected timing elements, for causing the potential at said takeoff point to change in a manner controlled by the values of said timing elements;

a unijunction transistor;

a connection from said takeoff point to the base electrode of said unijunction transistor—whereby said changing potential at said takeoff point may activate said transistor; and connecting means connected between said transistor and said switching means for causing said unijunction transistor, when activated, to produce a trigger signal for closing said switching means at a given instant in correspondence with the start of each of said reverse-polarity loops; and fifth means—activated by said initiating signal—for opening said switching means at a given instant in correspondence with the start of each of said straight-polarity loops.

6. Welding apparatus comprising:

electrode means for establishing a weld arc with a workpiece;

a power supply for applying current across the arc alternately in forward- and reverse-polarity increments;

delay means;

means, responsive to start of the reverse-polarity increment, for actuating the delay means;

means, responsive to termination of the period established by the delay means, for attenuating the reverse-polarity current increment, so that the period of said delay means is considerably less than one-half duration of the reverse-polarity current increment.